Feb. 18, 1941.  R. D. BEAN  2,232,202
TIME TEMPERATURE MEASURING INSTRUMENT
Filed Oct. 15, 1938
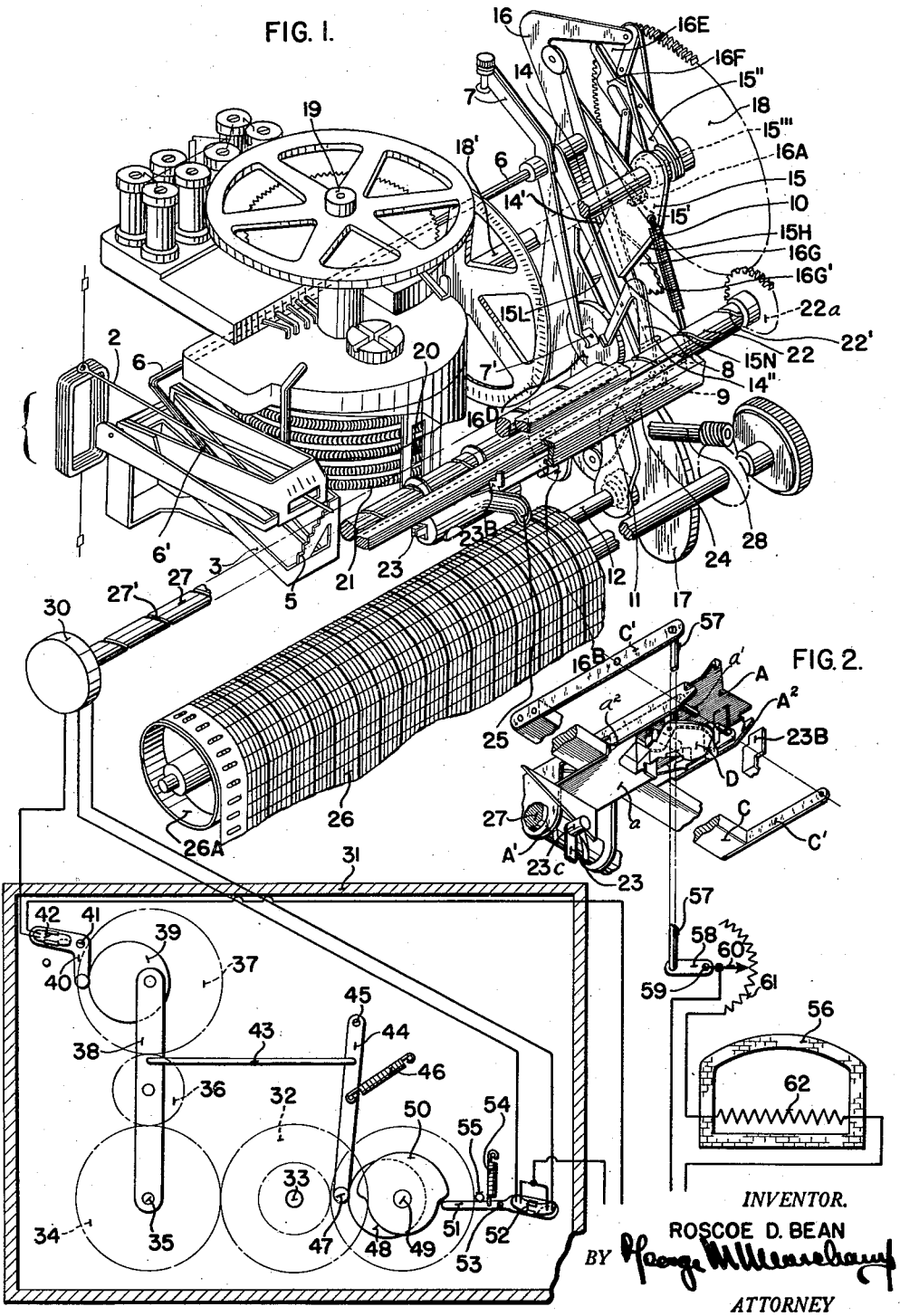
INVENTOR.
ROSCOE D. BEAN
BY
ATTORNEY Patented Feb. 18, 1941

2,232,202

UNITED STATES PATENT OFFICE 2,232,202

TIME TEMPERATURE MEASURING INSTRUMENT

Roscoe D. Bean, Ambler, Pa., assignor to The Brown Instrument Company, Philadelphia, Pa., a corporation of Pennsylvania Application October 15, 1938, Serial No. 235,144

10 Claims. (Cl. 236—46)

The present invention relates to temperature control and, more particularly, to the control of the temperature of an enclosure in such a manner that the temperature is automatically controlled according to a predetermined time cycle.

It is often desirable in the processing of various materials to bring them up to a certain temperature at some predetermined rate, hold that temperature for a period of time, and then to lower it at a given rate. In order to accomplish this, various types of timers have been developed which are more or less satisfactory, but which usually have the fault that they can only be set to raise and lower the temperature at some set rate which cannot be varied during the process.

It is an object of my invention to provide a method of and apparatus for changing the temperature of a space, such as a furnace, either up or down at any given rate or rates extending over any desired period of time. To this end, there is provided a reversible motor which is run in accordance with the desired time schedule to shift the position of a control table on a potentiometer of commercial form. The potentiometer then controls the temperature of the space in accordance with the position of the control table.

The various features of novelty which characterize my invention are pointed out with particularity in the claims annexed to and forming a part of this specification. For a better understanding of the invention, however, its advantages and specific objects obtained with its use, reference should be had to the accompanying drawing and descriptive matter in which I have illustrated and described a preferred embodiment of the invention.

In the drawing:

Fig. 1 is a perspective view of a potentiometer control mechanism with a diagrammatic view of a timer for adjusting its control table; and Fig. 2 is a view showing a manner of controlling the temperature of a space from the position of the control table on the potentiometer.

The recording potentiometer instrument shown in perspective in Fig. 1, and significant operative parts of which are illustrated in that figure, includes a galvanometer, the pointer 2 of which deflects in response to a condition of unbalance in the potentiometer measuring circuit, which may be any well-known form including the resistance 21 which may be adjusted to rebalance the potentiometer. The instrument also comprises mechanical relay provisions operated by a constantly rotating driving motor (not shown) and controlled by the deflection of the galvanometer pointer 2 away from its normal zero position, to periodically rebalance the potentiometer circuit and move a pen or other recorder carriage 23 along a travelling record strip 26 to record the varying value of the quantity measured on said strip.

In respect to its recording potentiometer functions, the instrument shown is of the form disclosed in Patent No. 1,946,280, dated February 6, 1934, by Thomas R. Harrison, and in respect to the type of control mechanism employed herein, I make use of certain instrumentalities to be later disclosed.

The control provisions which, in their construction and arrangement, and in their combination with the above-mentioned rebalancing and carriage adjusting and control mechanism, constitute the features of the present invention, includes a control table, A, and means by which control resistances are actuated by said mechanism when the recorder carriage 23 is displaced in one direction or the other from the control table. The control table is adapted to be adjusted along the path of movement of the carriage 23 by the timer of my invention. The position of the control table along said path corresponds to, and determines the normal value of the quantity being measured, while the position, at any instant, of the carriage 23 corresponds to, and constitute a measure of, the current value of said quantity.

The mechanism of the instrument of Fig. 1 through which the deflection of the galvanometer pointer 2 controls the adjustments of the recorder carriage 23 the rebalancing of the potentiometer circuit on a variation in the quantity or value measured by the galvanometer comprises a pointer engaging and position gauging element 3. The latter is pivotally supported and, in connection with the hereinafter mentioned shaft 6, has a loading tendency which may well be due partly to spring and partly to gravital action, to turn upward into the position in which one or another of the shoulders 5 of the member 3 engage the pointer 2. The element 3 is engaged by, and turns with the arm 6' of a rock shaft 6. A spring 10 tends to hold a rocker 8, which is journaled on a pivot 9, in the position in which the rocker engages an arm 7 secured to the shaft 6, and thereby holds the latter in a position in which the shoulders 5 are all below the pointer 2.

A cam 11, which is carried by a shaft 12 constantly rotated by the instrument driving motor through a speed reduction gearing, turns the rocker 8 about its pivot against the action of the spring 10, once during each revolution. This allows the arm 7 to turn counter-clockwise, as seen in Fig. 1, until the corresponding angular movement of the shaft 6 is interrupted by the engagement of one or another of the shoulders 5 of the member 3 with the galvanometer pointer 2. The shoulders 5 are so arranged that the turning movement of the shaft 6 and arm 7, thus permitted, will be greater or less according to the deflective position of the pointer 2 at the time. When the arm 7 thus turns counter-clockwise, a lateral projection 7' of that arm engages and turns a secondary pointer element 14 into a position corresponding to the then deflection of the pointer 2. The secondary pointer 14 is loosely journaled on the shaft 6, and has a gravitational loading tendency to turn in the clockwise direction as seen in Fig. 1, so that the arm 14 normally bears against the projection 7' of the arm 7.

At the end of each angular adjustment of the secondary pointer 14 into a position corresponding to the then deflection of the galvanometer 2, one or another of the three shoulders 15H, 15N and 15L of a locking member 15 engages the bottom wall of a slot 14' in the member 14, and thereby frictionally holds the latter in the position occupied by it when such engagement occurs. When the pointers 2 and 14 occupy their neutral positions, the shoulder 15N of the member 15 comes into locking engagement with the member 14. When the galvanometer pointer 2 has deflected to the right as seen in Fig. 1, as it does when the actual value of the quantity measured is lower than that indicated by the previously made and still existing potentiometer adjustment, the secondary pointer 14 is engaged and locked by the shoulder 15L. When the galvanometer pointer deflects in the opposite direction from its neutral position, as it does when the actual value of the quantity measured is higher than that indicated by the existing potentiometer adjustment, the pointer 14 is engaged and locked by the shoulder 15H of the member 15. The locking part 15 is given a tendency to move into locking engagement with the secondary pointer 14 by the spring 10, but is periodically held out of such engagement by the action on its projection 15' of a projection 16A carried by a ratchet lever 16 pivoted at 16B.

A spring gives the lever 16 a tendency to turn forward in the clockwise direction as seen in Fig. 1, but throughout the major portion of each rotation of the shaft 12, the lever 16 is held in a retracted position by a cam 17 carried by said shaft and engaged by the cam follower roll 16D carried by the lever 16. The ratchet lever 16 is operatively connected to two pawls 16E and 16F cooperating with a toothed wheel 18. Each of said pawls have a gravital tendency to occupy a position in which it does not engage the teeth of the wheel 18, but one or the other of the pawls is brought into engagement with the teeth of the wheel on each forward or clockwise movement of the lever 16, if the locking part 15 is then at one side or the other of the intermediate or neutral position which it occupies when the galvanometer pointer 2 is in its neutral position.

The position assumed by the part 15, when in locking engagement with the secondary pointer 14, controls the action of the pawls 16E and 16F by virtue of the fact that a collar or hub portion 15''' of the part 15 carries a spring pawl engaging arm 15''. The movement of the locking part 15 into the position in which its shoulder 15H engages the secondary pointer 14 causes the arm 15'' to move the pawl 16E into operative engagement with the teeth of the ratchet wheel 18, and the clockwise or forward movement of the ratchet lever 16 then gives a clockwise adjustment to the ratchet wheel. Conversely, when the part 15 moves into the position in which its shoulder 15L engages the secondary pointer 14, the arm 15'' shifts the pawl 16F into operative engagement with the wheel 18, and the latter is then adjusted in the counterclockwise direction.

The extent of the adjustment then given the wheel 18 is made dependent upon the position of the secondary pointer 14, as said position determines which of the various shoulders of an arm 16G carried by the lever 16 shall then engage a projecting portion 14'' of the secondary pointer 14, and thereby arrest the forward movement of the ratchet lever 16. In the neutral position of the galvanometer pointer and secondary pointer 14, the projection 14'' of the latter engages the central shoulder 16G' of the arm 16G and the lever 16 is then held against any operative movement in the clockwise direction. When the secondary pointer position is more or less to one side or the other of its neutral position, the portion 14'' engages an upper or lower shoulder of the arm 16G more or less distant from the central shoulder 16G', and the lever 16 is then permitted more or less forward movement.

The rotation of the wheel 18 in one direction or the other effects corresponding potentiometer rebalancing adjustments and position adjustments of the recorder carrier 23. The rebalancing adjustments are effected by means of a rheostat shaft 19 which is geared to the shaft 18' on which the wheel 18 is secured. The rotation of the shaft 19 moves a bridging contact 20 along the convolutions 21 of a potentiometer resistance helically disposed about the axis of the shaft 19, and thereby varies the amount of said resistance in the potentiometer circuit. The resistance adjustments made in response to a deflection of the galvanometer pointer in one direction away from its neutral position rebalances, or tends to rebalance, the potentiometer circuit and thereby returns, or tends to return, the galvanometer pointer to its neutral position.

The rotation of the wheel 18 adjusts the recorder carrier 23 by virtue of the fact that the teeth of the wheel 18 are in mesh with the teeth of a gear 22a carried by a carriage adjusting shaft 22 which is formed with a thread groove 22' of coarse pitch which receives a cam or mutilated screw thread rib secured to the carriage 23, so that the latter is moved longitudinally of the shaft 22 as the latter is rotated.

The marker carriage 23 comprises a frame portion formed of a single piece of sheet metal cut and bent to form a flat underbody portion transverse to and through which the shaft 22 extends, two projections 23B, one at each front corner of said body portion which bear against the inner edge and upper side of the lower flange of a channel bar or rail 24 forming part of the instrument framework, and a projection terminating in roller 23c (Fig. 2) which extends in a vertical plane transverse to the shaft 22 and rail 24. In addition, the body portion of the carriage frame is provided with a forwardly extending tongue passing beneath the rail 24 terminating in an uprising pointer or index (not shown) adapted to cooperate with a scale fastened to the front face of the rail 24 to indicate the position of the pen carriage and the value of the quantity measured and recorded by the instrument.

The record sheet 26 passes over and is given feeding or advancing movements by a record feed roll 26A. The latter is intermittently rotated by means of a worm and screw connection between the shaft of the roll 26A and a transverse shaft 28. Shaft 28 is intermittently actuated by means of a ratchet and lever device which is engaged and oscillated by an arm of the rocker 8 on each oscillation of the latter.

The control table A of the instrument shown in Fig. 2 comprises a sheet metal frame having ear portions A' apertured for the passage of a shaft 27 mounted in the instrument framework alongside the shaft 22, and having bearing parts $A^2$ which engage and slide along the upper flange of the rail 24. To facilitate the adjustment of the control table A along the path of travel of the pen carriage 23, the shaft 27 is shown as formed with a thread groove 27' which is adapted to receive a cam or mutilated thread rib part that may be secured to the control table frame. The shaft 27 may be rotated to adjust the control table in any suitable manner, as by means of a reversible motor 30 directly connected to the shaft 27, as shown.

A member $a$ is hinged at one edge to the frame of the control table A by a pivot or pintel shaft $a'$ extending parallel to the shaft 27. The member $a$ is formed with guiding provisions including a part $a^2$ for a bar-like part C which extends parallel to the shaft 27 and is rigidly secured at its ends to arms C' at opposite ends of the instrument which arms are pivotally connected to the instrument framework, so that the yoke like structure formed by the bar C and arms C' may turn with respect to the instrument framework about an axis coinciding with that of the hinge connection $a'$, between the table A and part $a$. The part $a$ and bar C are held by the said guiding provisions against independent turning movements about the axis of their respective pivotal supports. The part $a$ and bar C have a gravital tendency to move from their highest positions, shown in Fig. 2 counter-clockwise around $a'$ toward their lowermost position. Their movement downward below their last-mentioned position is prevented by the engagement of a projection on the arm C' with an adjacent portion of the instrument framework. The extent to which the parts $a$ and C are permitted to swing downwardly from their uppermost positions depends upon the relative positions of the table A and the recorder carriage 23. When the value of the quantity measured is so low that the carriage 23 is entirely at the low side (left-hand side as seen in Fig. 1) of the control table A, the carriage 23 permits movement of the parts $a$ and C to their lowest position. When the current value of the quantity measured is suitably close to the normal value of that quantity, the control table and marker carriage 23 are in such relative positions that downward movement of the hinged part $a$ is prevented or restricted by the engagement of a portion of that part with the roller 23C on the marker carriage 23. When an increase in the quantity measured results in a movement of the recorder carriage 23 to the high side of the control table A, that movement causes the part $a$ to be positively secured against down movement from its uppermost position by adjusting a latch member D into its latching position in a manner set forth in detail in the above mentioned Patent 1,946,280.

Movements of the part A are used to control the condition to which the galvanometer 2 is responsive, and the position of the control table A along the chart 26 is used to determine the value at which it is desired to keep the condition. If, for example, the condition under control is the temperature of a furnace as is here shown, and it is desired to maintain that temperature at a constant value the control table A would be placed at a position along the chart corresponding to that temperature. Then as the value of the temperature changes, as indicated by the position of the pen carriage 23, its roller 23C would move along the inclined edge of part $a$ and shift that part around its axis $a'$ to a position corresponding therewith and movement of this part will regulate the temperature to its correct value in a manner to be later described. If, however, it is desired to vary the value of the temperature from time to time or at some particular rate it is only necessary to rotate shaft 27 in the proper direction and at the proper speed to shift the control table transversely of the chart.

The present invention is more particularly directed to an apparatus for shifting the control table A along the chart at any desired rate. To this end a reversible motor 30 is either geared directly or through a reduction gear, as may be necessary to obtain the proper speed, to the shaft 27 upon which the control table is mounted. This motor may then be energized in a suitable fashion to give the control table a direction and rate of motion that corresponds to the temperature change which is desired in the furnace. Such a means is shown enclosed in a casing 31 of suitable shape and consists of a gear 32 on a shaft 33 that is driven at a constant speed by some means (not shown). This gear, through a gear 34 mounted on a shaft 35 and gears 36 and 37 mounted on stud shafts attached to a lever 38 pivoted around shaft 35, rotates a cam 39 at a constant speed. As the cam 39 rotates it engages one arm of a bell-crank 40, pivoted at 41, to periodically tilt a mercury switch 42 attached to the other arm thereof from its closed to its open position. This switch 42 is in the common line to the reversible motor 30 so that the motor is energized for rotation for an amount of time dependent upon the time that switch 42 is closed. This time can be changed by moving the cam 39 nearer to or further from the bell-crank 40 by moving lever 38 around its pivot on shaft 35.

It follows that if some means is provided to move lever 38 around its pivot in accordance with a predetermined schedule that the motor 30 can be energized for varying amount of time in order to move the control table A up or down scale at varying rates of speed. Such a means is provided and consists of a link 43 to connect lever 38 to a second lever 44 that is pivoted at 45 and biased in a counter-clockwise direction by a spring 46. The lower end of lever 44 is provided with a roller 47 that bears on a cam 48 that is on shaft 49 and is also driven at a constant speed from shaft 33. The cam 48 can be given any desired shape so that the length of time the switch 42 is closed will vary in proportion to the rate that it is desired to change the temperature of the furnace. If cam 39 is moved by cam 48 to the left far enough, the switch 42 will remain open during its entire rotation and motor 30 will not be energized, so that the control table will remain at the same point to keep the temperature of the furnace constant. If on the other hand the cam 39 is shifted to the right it will not engage the bell-crank 40 at all, so that the switch 42 will remain closed and motor 30 will move the control table A at its maximum speed.

In some cases it may be desired to raise the temperature of the furnace and then to lower it. For this purpose there is provided a cam 50, also on shaft 49, that is used to periodically tilt a lever 51 upon which is mounted a double throw switch 52 that is adapted to cause the energization of one or the other field of the reversible motor 30. The lever 51 is pivoted at 53 and is normally biased in a clockwise direction by a spring 54 into engagement with a stop 55. In this position the contacts at one end of the switch 52 are closed and the motor 30 will be energized to rotate in one direction. When, however, the high portion of the cam 50 engages the lever 51 that lever will be tilted counter-clockwise to close the contacts in the other end of the switch 52, so that motor 30 will be energized for rotation in the other direction.

As has been mentioned above the control for the furnace, shown diagrammatically at 56 in Fig. 2, is responsive to movement of the part a on the control table. As this part moves, the bar C and the arms C' move with it around their pivots on the frame of the potentiometer. One of the arms C' is extended forwardly of its pivot (the left one in Fig. 2) and has connected to it one end of a link 57, the other end of which is connected to a lever 58 pivoted at 59. This lever has attached to it a contact 60 which moves across a resistance 61 in circuit with an electrical heating unit 62 in the furnace 56. Therefore, as part a moves around its pivot a' the contact 60 will be moved across the resistance 61 to change the temperature of the heating unit 62 and the furnace 56.

In operation, as the pen carriage 23 is moved along the chart 26 in response to measurements made of the temperature of the furnace by any suitable means, such as a thermocouple in the furnace connected to the galvanometer 2, the roller 23C will be moved with respect to the part a on the control table. Due to its engagement with the inclined edge, part a will be moved around its pivot a' to in turn move bar C and arms C' to shift contact 60 along resistance 61. The parts are so arranged that as the pen carriage moves up scale, or to the right in Figures 1 and 2, due to an increase in temperature of the furnace, the part a will be rotated clockwise in Fig. 2 and cut more resistance in the circuit of heater 62. Now if, for example, it is desired to increase the temperature of furnace 56 the motor 30 will be rotated in a direction to move the control table up scale or to the right in Fig. 1. Part a due to its gravitational bias against roller 23C will be moved counter-clockwise from the position shown and the resistance 61 will be cut out of the circuit of heater 62 thus allowing full current to pass therethrough. As the temperature of the furnace increases the relay mechanism will move the pen carriage 23 with its roller 23C to the right to tend to shift part a around its axis to cut some of the resistance into the heater circuit. In this fashion the temperature of the furnace is raised to some desired point at which the control table is stopped. Movement of roller 23C relative to part a will then maintain the temperature of the furnace at the desired point. If the temperature of the furnace is to be lowered the reverse of the above operation will take place.

The rate at which the control table A moves up or down scale will depend upon the position of lever 38 and cam 39 relative to the bell-crank 40 and this rate can be varied at will by the use of a cam 48 that is properly shaped. This cam can be so shaped with respect to cam 50 that the temperature can be raised at one rate and lowered at another. It will readily be apparent that by using cams of the proper shape, the instrument can be made to control the temperature of the furnace according to any desired schedule.

From the above detailed description it will be seen that I have provided an automatic timer which may be used in combination with a potentiometer to vary the value of the condition to which the instrument is responsive according to any predetermined schedule. An important feature of the invention is in the provision of a mechanism which can be used to change the value of the condition at any rate or plurality of rates. For example by proper shaping of the cam 48 the temperature of the furnace may be slowly brought up to a given value at one rate and then raised at a faster rate to another value. Likewise the temperature may be lowered in a similar manner.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometime be used to advantage without a corresponding use of other features.

Having now described my invention, what I claim as new and desire to secure by Letters Patent is:

1. In a time temperature control mechanism, a member movable to a position corresponding to the value at which it is desired to maintain the temperature of a space, a part on said member, movement of which is adapted to vary the value of the temperature, means to move said part in accordance with the present value of the temperature, and means to shift said member, said means comprising a motor, a switch adapted to energize and deenergize said motor and means to vary the time that said switch is closed to thereby vary the average rate of speed at which said member is shifted by said motor.

2. In a time temperature control mechanism, a control instrument, a member forming part of said instrument and movable through a path thereon to change the desired value of the temperature of a space, a motor to move said member, means to drive said motor for varying lengths of time, said means comprising a timer having a switch for said motor, means to open and close said switch, and means to vary the time that said switch is closed in accordance with a predetermined schedule whereby said member will be moved at varying rates of speed.

3. In combination with a control instrument a part movable in accordance with the value of a condition, a cam in the path of movement of said part and shifted thereby, means operated by said cam to vary the value of said condition, a member upon which said cam is mounted, means to shift said member and cam along the path of movement of said part to thereby vary the point at which said cam and part will be in engagement, means to supply power to said shifting means and means to vary the supply of power in accordance with a predetermined schedule.

4. In combination with a control instrument, a device movable through a path to positions in accordance with the present value of a condition, a part in the path of movement of said device and adapted to be moved thereby, means actuated by said part to vary the value of said condition, a member movable through a path parallel to that of said device and carrying said part, means to shift said member along said path to vary the point at which said part and device will be in engagement, said last means comprising a reversible motor, a switch for said motor, means to periodically open and close said switch, automatic means to vary the time said switch is open and means to reverse the direction of said motor operative in timed relation with said automatic means.

5. In combination with a measuring and control instrument adapted to vary the value of a condition, a member movable along a path, means actuated in accordance with the position of said member to vary the value of said condition, a motor to shift said member, a switch intermittently opened and closed to energize said motor and automatic means to vary the length of time said switch is opened and closed to thereby vary the speed at which said member is shifted.

6. The combination of claim 5 in which the last mentioned means includes a cam adapted to operate said switch, a lever to vary the actuation of said switch by said cam and means for adjusting said lever in accordance with a predetermined time cycle.

7. The combination of claim 5 in which the last mentioned means includes a cam adapted to operate said switch, a lever to vary the actuation of said switch by said cam and means for adjusting said lever in accordance with a predetermined time cycle, including a second cam configured in accordance with the desired schedule.

8. The combination of claim 5 and means automatically governing the direction of rotation of said motor.

9. The combination of claim 5 and means automatically governing the direction of rotation of said motor, including switching means and a cam adapted to operate said switch in accordance with the desired schedule.

10. In combination with a measuring and control instrument adapted to vary the value of a condition, a member movable along a path, means actuated in accordance with the position of said member to vary the value of said condition, a motor to shift said member, a switch intermittently opened and closed to energize said motor, cam means to vary the length of time said switch is opened and closed to thereby vary the speed at which said member is shifted, a switch to determine the direction of rotation of said motor and cam means operating the second mentioned switch.

ROSCOE D. BEAN.